(12) United States Patent
Ignaczak et al.

(10) Patent No.: US 7,520,539 B2
(45) Date of Patent: Apr. 21, 2009

(54) PIPE CLAMP WITH GASKETED CENTER RIB

(75) Inventors: Brian T Ignaczak, Rochester, MI (US); Scott T Cassel, Bloomfield Hills, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 211 days.

(21) Appl. No.: 11/351,952

(22) Filed: Feb. 10, 2006

(65) Prior Publication Data

US 2006/0175837 A1    Aug. 10, 2006

Related U.S. Application Data

(60) Provisional application No. 60/716,465, filed on Sep. 12, 2005, provisional application No. 60/651,773, filed on Feb. 10, 2005.

(51) Int. Cl.
*F16L 21/02* (2006.01)

(52) U.S. Cl. .................. 285/367; 285/420; 285/408; 285/410

(58) Field of Classification Search .......... 285/420, 285/408, 410, 367
See application file for complete search history.

(56) References Cited

U.S. PATENT DOCUMENTS

| | | | | |
|---|---|---|---|---|
| 2,426,423 A | * | 8/1947 | Woolsey | 285/233 |
| 2,731,280 A | | 1/1956 | Goodliffe et al. | |
| 2,778,661 A | * | 1/1957 | Leighton | 285/110 |
| 2,828,986 A | * | 4/1958 | Mahoff et al. | 285/233 |
| 3,207,538 A | | 9/1965 | Pattillo | |
| 3,327,945 A | * | 6/1967 | Pfister | 236/45 |
| 3,801,141 A | * | 4/1974 | Hollingsworth | 285/236 |
| 4,056,273 A | * | 11/1977 | Cassel | 285/337 |
| 4,165,109 A | * | 8/1979 | Foti | 285/148.26 |
| 4,185,858 A | * | 1/1980 | Peash | 285/367 |
| 4,312,526 A | * | 1/1982 | Cassel | 285/419 |
| 4,629,226 A | * | 12/1986 | Cassel et al. | 285/382 |
| 5,411,162 A | | 5/1995 | Koziczkowski et al. | |
| 6,073,977 A | | 6/2000 | Schmidt-Hansen et al. | |
| 6,312,025 B1 | * | 11/2001 | Wolfsdorf | 285/369 |
| 6,457,748 B1 | * | 10/2002 | Webb et al. | 285/47 |
| 6,758,501 B2 | * | 7/2004 | Amedure et al. | 285/373 |
| 6,877,780 B2 | | 4/2005 | Potts et al. | |
| 7,052,052 B2 | * | 5/2006 | Protas et al. | 285/420 |
| 7,231,694 B2 | * | 6/2007 | Ignaczak et al. | 24/279 |
| 2005/0099001 A1 | | 5/2005 | Cassel et al. | |
| 2005/0184522 A1 | | 8/2005 | Potts et al. | |

* cited by examiner

*Primary Examiner*—David E Bochna
(74) *Attorney, Agent, or Firm*—Reising Ethington P.C.

(57) ABSTRACT

A pipe clamp for connecting pipe ends together to form a gas tight seal. The clamp includes an open band, tightening mechanism, split sealing sleeve, and inner gasket. The band extends circumferentially from a first end to a second end and has a pair of axial ends. The band includes a radially protruding rib located inwardly of the axial ends, and this rib extends at least part way between the first and second ends. The split sleeve is disposed within the band and is located at least within the rib. The gasket is disposed radially within the sleeve such that it is located at least partially within the rib. Each of the pipe ends can have a protruding bead and the clamp can be placed over the two pipe ends during assembly such that the beads engage the gasket within the center rib region of the band.

16 Claims, 8 Drawing Sheets

PIPE CLAMP WITH GASKETED CENTER RIB

CROSS-REFERENCE TO RELATED APPLICATIONS

This application claims the priority of U.S. Provisional Application No. 60/651,773, filed Feb. 10, 2005, and U.S. Provisional Application No. 60/716,465, filed Sep. 12, 2005. The entire contents of these two provisional applications are hereby incorporated by reference.

FIELD OF THE INVENTION

This invention relates generally to pipe clamps and, more specifically, to both band clamps and pipe couplers used for connecting pipes or other tubular members together either telescopically or in an end-to-end configuration.

BACKGROUND OF THE INVENTION

A typical vehicle exhaust system includes an assembly of tubes, or pipes, that provide transport of engine exhaust gases. Each individual pipe section is connected to another pipe section to form a complete exhaust system assembly. Such connections are usually either telescopic or as an end-to-end abutting connection. To be effective, the connection formed between these pipes should provide a suitable fluid-tight seal against exhaust gas leakage. The connection should also have a high degree of mechanical strength and be capable of being disassembled for possible maintenance and repair.

Pipe couplers are often used for exhaust systems where the pipe sections are axially joined in an end-to-end configuration. A conventional pipe coupler includes a band having a generally circular conformation and terminating in opposing connecting flanges that can be drawn together or loosened via a fastener or other tightening mechanism. A reaction member can be provided between the flanges to help provide an even distribution of circumferential forces on the pipes as the band is tightened. Often, the pipe coupler will include an internal split sealing sleeve with mating circumferential ends that engage each other during tightening to produce a gas-tight seal. U.S. Pat. No. 6,758,501, issued Jul. 6, 2004 is an example of such a pipe coupler having a split sealing sleeve. Ribbed pipe couplers are also known as shown and described in U.S. Pat. No. 6,877,780, issued Apr. 12, 2005. The entire contents of these two patents are hereby incorporated by reference.

SUMMARY OF THE INVENTION

In accordance with the invention there is provided a pipe clamp for connecting two pipes or other tubular bodies in which the clamp includes an open band, tightening mechanism, split sealing sleeve, and inner gasket. The band extends circumferentially from a first end to a second end and has a pair of axial ends. The band includes a radially protruding rib located inwardly of the axial ends, and this rib extends at least part way between the first and second ends. The tightening mechanism is connected to the band to draw the first and second ends toward and away from each other for tightening and loosening of the band. The split sleeve is disposed within the band and is located at least within the rib. The gasket is disposed radially within the sleeve such that it is located at least partially within the rib.

The pipe clamp can be used in conjunction with either a telescoping or abutting pipe end configuration. Preferably, the pipe ends each have a protruding circumferential bead that together fit within underneath the gasket and within the rib of the band when the pipe ends and clamp are assembled together. In one embodiment, the pipe clamp uses a single bolt fastener that is axially centered on the band's rib. In another embodiment, a two-bolt tightening mechanism is used in which each of the two bolts are located on opposite axial sides of the center rib.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
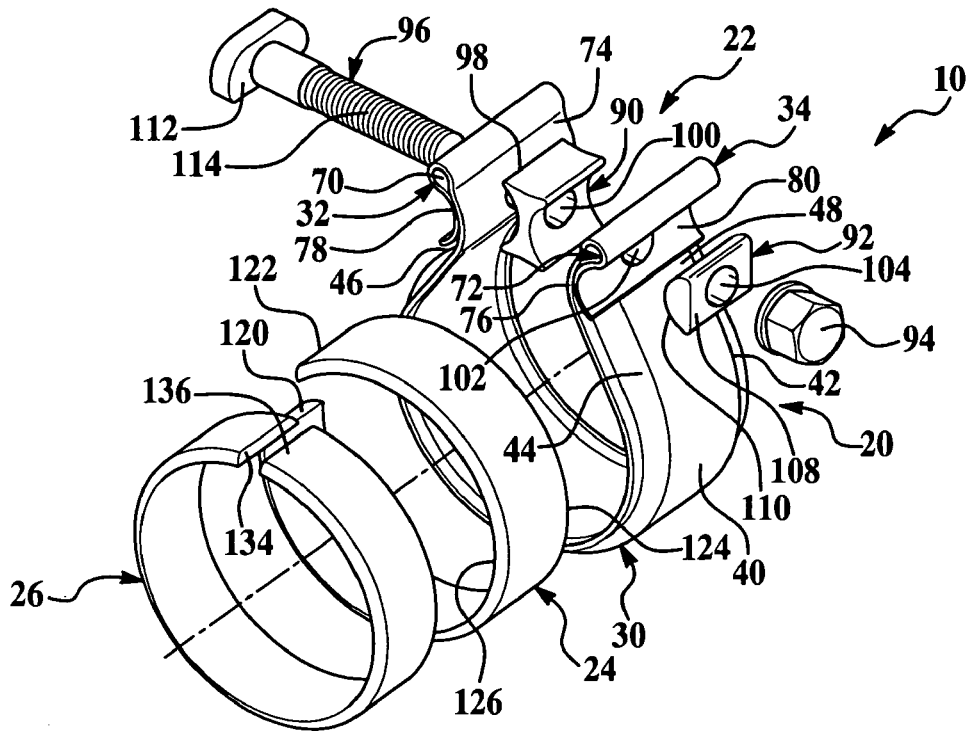
FIG. 1 is an exploded perspective view of a band clamp constructed in accordance with a first embodiment of the invention.

The drawings illustrate various embodiments of the invention including both band clamps and pipe couplers as they might be used for automotive engine exhaust systems. It will be appreciated as the description proceeds that the invention is useful in many different applications and in a wide variety of embodiments. For example, the invention can be used not only as a band clamp that clamps around overlapping pipes connected in a telescopic fashion, but can also be used as a pipe coupler that fastens around adjoining pipes connected in an end-to-end manner. As used herein, the term "pipe clamp" is used to refer to both pipe couplers and band clamps. Furthermore, the terms axially, angularly, and radially refer to directions relative to the cylindrically tubular shape of the illustrated pipes and band clamp, so that the axial direction extends along the axis of this tubular shape, radial directions extend radially away from this axis, and angularly refers to locations at points around the circumference of the band clamp.

With reference to FIGS. 1-4, band clamp 10 is designed to securely couple two telescopically connecting pipe ends together such that a gas-tight interface is created, and generally includes a band 20, a tightening mechanism 22, a sleeve 24 and a gasket 26. Band 20 is a flat band of sheet steel formed into an open loop, and it includes a main body portion 30 with a pair of opposing flanges 32 and 34 located at each end. Tightening mechanism 22 is used to draw flanges 32, 34 together during tightening of the band clamp, which has the effect of constricting all of the band clamp components around a pair of pipe ends. Like band 20, sleeve 24 and gasket 26 are also flat band-shaped components in the form of an open loop, and these components are sized such that gasket 26 fits within sleeve 24 which in turn fits within band 20. It should be recognized that while the particular embodiment shown here includes the above-mentioned components, other components could be added to or removed from band clamp 10 in order to accommodate the needs of the particular application with which the band clamp is being used.

Figure 2:
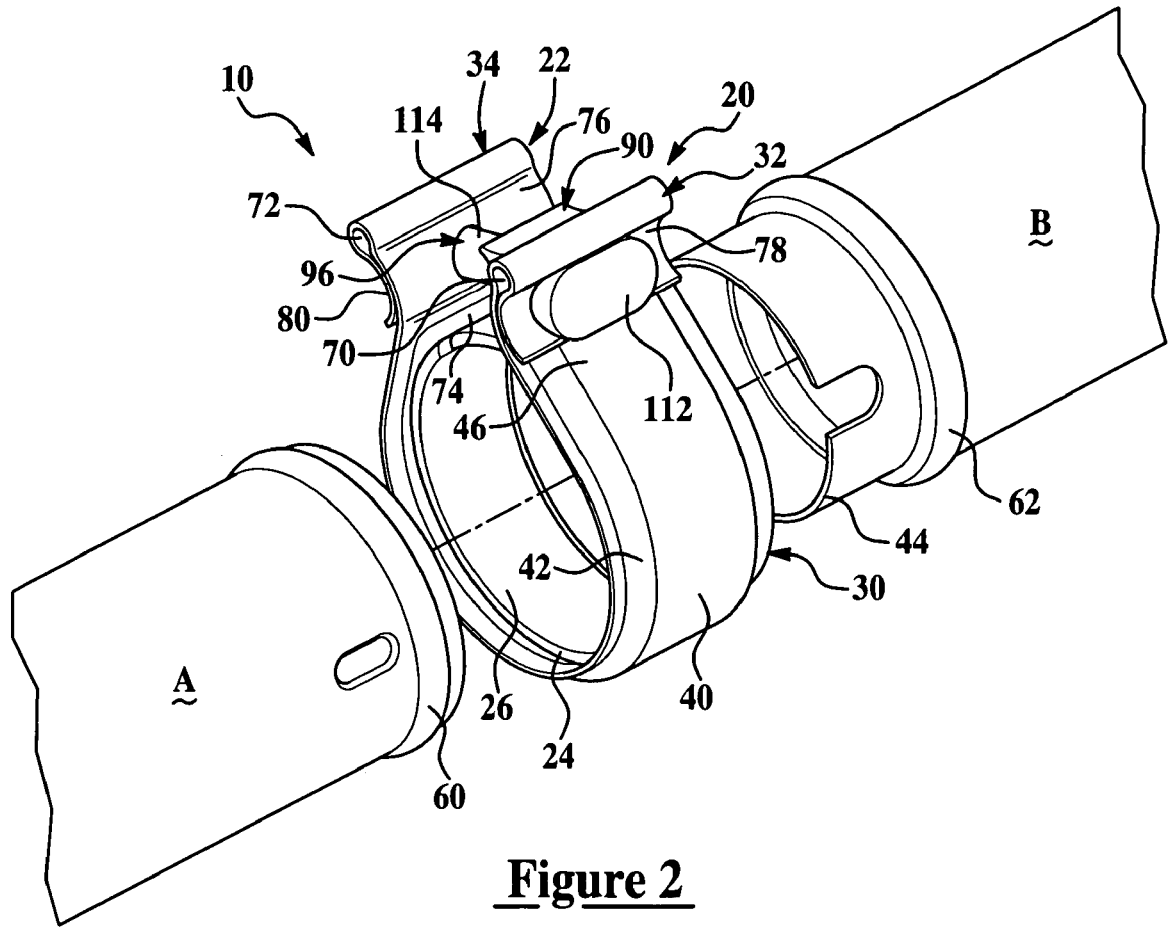
FIG. 2 is a perspective view of the band clamp of FIG. 1 showing it aligned with a pair of telescoping pipe ends for assembly onto the pipe ends.
Figure 3:
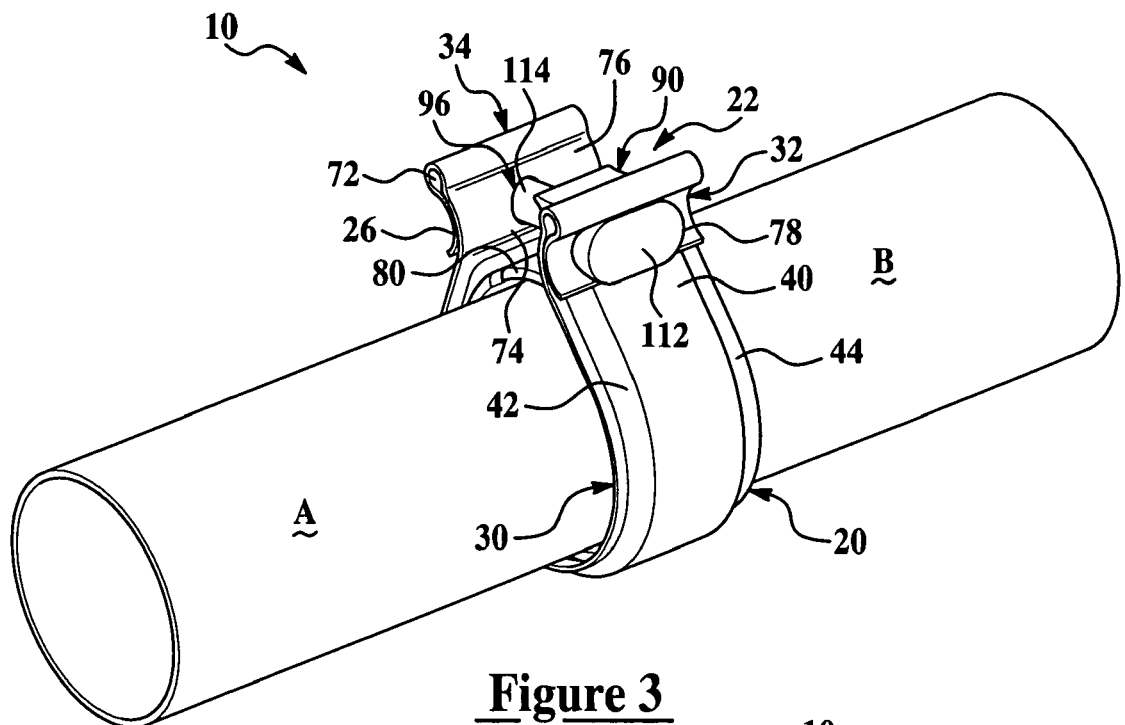
FIG. 3 is perspective view showing the band clamp of FIG. 1 assembled loosely onto the pipe ends.

Band 20 is designed to circumferentially surround a telescopic connection of pipes A and B as indicated in FIGS. 2 and 3. Body portion 30 includes a radially protruding center rib 40, a pair of annular side walls 42, 44 and a pair of transitional sections 46, 48. Center rib 40 is bound by annular side walls 42, 44 and by sections 46, 48, and this center rib circumferentially extends around body portion 30 with a uniform axial width. The axial width of center rib 40 can be substantially greater or less than the embodiment shown here, depending upon the particular application for which the band clamp is used. Center rib 40 circumferentially terminates at the transition sections 46, 48 at each end which taper back into body portion 30. The center rib is designed to accommodate and coact with a pair of circumferential ribs, or beads 60, 62, located near the ends of pipes A and B. As shown in FIG. 2, beads 60 and 62 are preferably located just inwardly of the ends of pipes A and B, respectively. The width of center rib 40 is selected in accordance with the positioning of beads 60, 62 relative to the ends of the two pipes, among other factors, so that the beads can both sit within the center rib when the pipe ends are brought together into coaxial telescoping alignment. This is shown in FIG. 3, wherein the pipe ends are in telescopic connection within a loosened band clamp 10.

Flanges 32, 34 are unitary portions of opposite ends of band 20 that are folded away from each other and back on themselves to define a pair of radially-protruding loops 70, 72 each having an inner and an outer leg. Each of the flange inner legs includes an opposing contoured abutment surface 74, 76 which engages opposite sides of a tightening mechanism component. As best seen in FIG. 1, contoured abutment surfaces 74, 76 are shaped and sized to engage a complementarily shaped component of tightening mechanism 22. Similarly, each of the flange outer legs includes an oppositely contoured abutment surface 78, 80 for mating with a different component of the tightening mechanism 22. When tightening mechanism 22 is tightened, outwardly biased flanges 32 and 34 are drawn together such that the various contoured surfaces 74-80 of the flanges mate with corresponding surfaces of the tightening mechanism, as will be subsequently explained in greater detail.

Tightening mechanism 22 generally includes a contoured reaction member 90, a half-round backing plate 92 and a nut and bolt fastener combination 94, 96, and utilizes a single-bolt arrangement to maintain band clamp 10 in a fastened position. Reaction member 90 has a generally double-convex configuration and is designed to mate between abutment surfaces 74 and 76 when mechanism 22 is tightened so that an aperture 100 lines up with apertures 98, 102 and 104. Half-round backing plate 92 takes the general form of a cylinder that has been cut in half by a plane passing through its center axis, and includes a flat surface 108 and a contoured abutment surface 110. Contoured surface 110 contacts and mates with abutment surface 80 of flange 34, however, the nut and bolt are interchangeable so that surface 110 could contact surface 78 on flange 32 instead. Bolt 96 is preferably a T-bolt having a half-round head 112 that extends axially in order to distribute the tightening load across the flange, and a shank 114 extending through apertures 98-104. As will be seen in conjunction with the pipe coupler embodiments of FIGS. 5-9, the reaction member 90 and/or backing plate 92 can be provided with a notched out section designed to accommodate center rib 40. Furthermore, that notched out section can have a depth selected in accordance with the height of center rib 40 such that when the bolts are fully tightened the reaction member and/or backing plate engage the rib and provide a radially inward force to help lock down the sleeve and gasket over the pipe ends. Nut 94 is tightened against backing plate 92 (with or without washers) which distributes the tightening force across the axial width of flange 34. It will be appreciated by those skilled in the art that other tightening mechanisms can be used, including those which do not utilize a reaction member.

Sleeve 24 is preferably an open loop-shaped component that is designed to seat within center rib 40 and receive gasket 26, and includes mating ends 120, 122 and tapered side walls 124, 126. The circumferential separation of mating ends 120, 122 is chosen such that the mating ends nearly come into engagement with each other once band clamp 10 is fully tightened over the pipe ends, but are still separated by a small distance such as 1-20 mm. Sleeve 24 has a shape and size that complements that of center rib 40 and is maintained in between the tapered side walls 42, 44; sidewalls 42, 44 of the band are designed to line up with side walls 124, 126 of the sleeve. Although sleeve 24 is shown here with a width that is largely the same as that of center rib 40, it is possible to provide sleeve 24 with an axial width that is greater than that of band 20 itself. This results in one or more sides of sleeve 24 protruding outwards and away from band 20. The sleeve 24 can also have a width relative to the band 20 that is less than that shown. To orient sleeve 24 within band 20 in a desired rotational position, the sleeve can include a detent (not shown) that aligns with a notch or opening (also not shown) in the band. Other known or newly developed arrangements for aligning these components can be used. Furthermore, other types of mating end configurations can be used, such as the tongue and groove arrangements disclosed in the aforementioned U.S. Pat. No. 6,758,501.

Gasket 26 is preferably an open loop-shaped component made of a relatively soft material that fits within sleeve 24 and is compressed during the tightening process so that a satisfactory seal between pipes A and B is formed. The particular embodiment shown here has a uniform axial width and thickness and is designed to be received between side walls 124, 126 of the sleeve. Gasket 26 preferably includes straight mating ends 134, 136 and a circumferential separation that causes them to barely come into engagement with each other when band clamp 10 is fully tightened. The mating ends 134, 136 can also be tapered to allow a slight overlap of the ends without (substantially) increasing the thickness of the gasket at the overlap. Because of the relatively soft nature of the gasket, when a sufficient amount of tightening force is exerted upon mating ends 134 and 136 they flow into another so that any gaps left therebetween are filled. Of course, other mating end configurations can be used, including a tongue and groove arrangement such as is used for the gasket shown in the embodiment of FIGS. 5, 7, and 9. Various suitable gasket materials will be known to those skilled in the art, including fiberglass and graphite-based materials (such as graphite with embedded steel), vermiculite, Thermiculite® (available from Flexitallic—www.flexitallic.com), stainless steel, or other gasketing approaches such as using thin steel formed with sealing beads that extend radially inwardly from its surface. Gasket 26 can be oriented within sleeve 24 such that mating ends 134, 136 of the gasket are angularly offset from those 120, 122 of the sleeve and this may in some instances improve the gas tight seal of the band clamp. The gasket is attached within the sleeve either by an outward "springing" force of the gasket due to its intrinsic resiliency, or can be more positively connected to the sleeve via an adhesive, detent, or other mechanical interconnection. Also, while the illustrated gasket covers the entire center rib area, gasket 26 can be axially shorter or could extend axially outside of the rib area.

Figure 4:
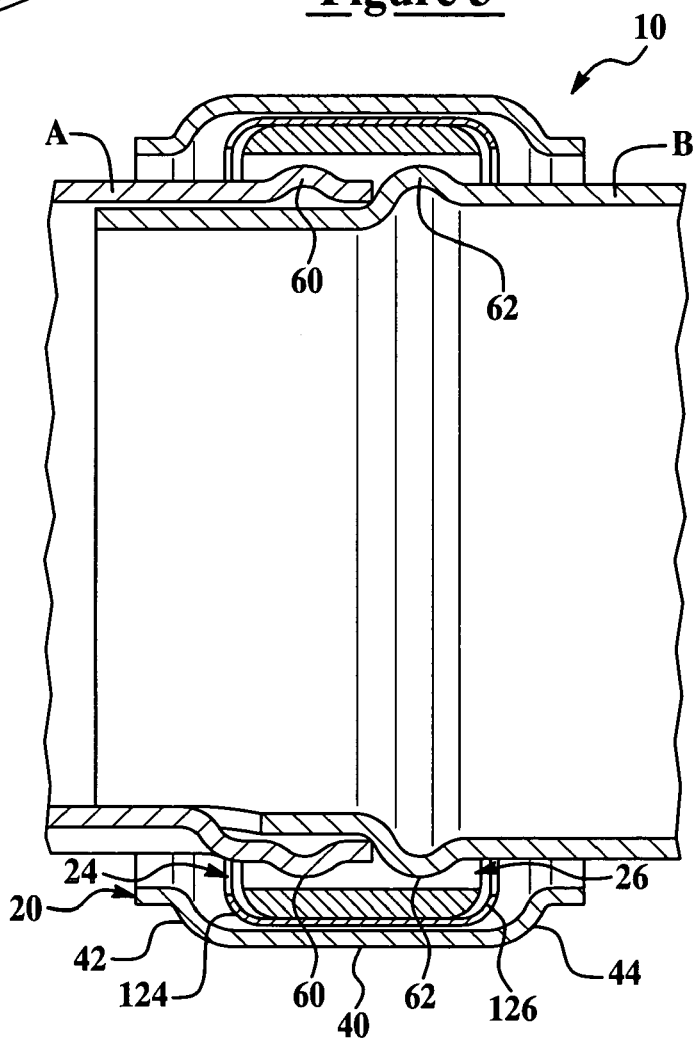
FIG. 4 is an enlarged, partial view of a cross-section taken along a horizontal plane extending through the axis of the assembled clamp and pipe ends of FIG. 3.

With reference now to the cross-sectional view shown in FIG. 4, once band clamp 10 is tightened, side walls 42, 44 of center rib 40 captively retain sleeve 24, gasket 26 and beads 60, 62 within the confines of the center rib. This provides the band clamp with enhanced pull-apart strength over non-ribbed couplers and clamps. The height of center rib 40 and beads 60, 62 on the pipe ends can be selected as desired or required for a particular application; however, the height is preferably large enough to provide a desired amount of pull-apart strength, but not so large as to create difficulties in fitting the pipe ends within the loosened coupler. Depending upon the available manufacturing tolerances and design requirements, the axial width of center rib 40 can be made just slightly shorter than the separation of beads 60, 62 when the pipe ends are in telescopic connection so that the respective engagement of side walls 42, 44 with beads 60, 62 during tightening forces the ends of the pipes into axially-compressive contact to help further seal the connection. Alternatively, the width of center rib 40 can be greater than the minimum axial length needed to accommodate both beads 60, 62 so that there may be axial separation of the pipe ends within the center rib. The beads 60, 62 can be formed by radial expansion of the pipe itself or can be a separate component welded or otherwise attached to the pipe section.

Turning now to FIGS. 5-11, a second embodiment is disclosed in the form of a pipe coupler 200 that includes a band 202, tightening mechanism 204, split sealing sleeve 206, and internal gasket 208. The band 202 is an open band that includes a cylindrical body portion 210 and a pair of opposing flanges 214, 216 that extend from the body portion to loops at the radially outward-most portion of the flanges. The tightening mechanism 204 is used to draw the flanges 214, 216 together during tightening of the coupler over a pair of abutting pipe ends A and B. The split sealing sleeve 206 is located radially within the band 202 and includes a pair of mating circumferential ends 222, 224 that engage and seal against each other during tightening of the band. The mating ends 222, 224 of the sealing sleeve 206 are angularly offset from the location of the flanges 214, 216 to help provide a gas-tight seal of the mating ends when they are drawn together during tightening of the band.

Figure 6:
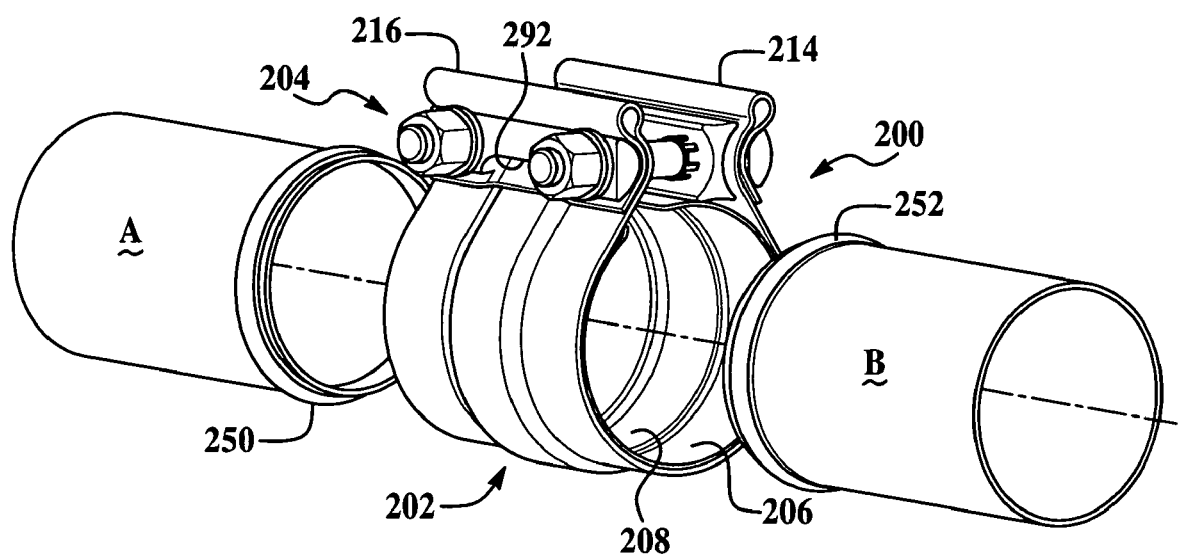
FIG. 6 is a perspective view of the pipe coupler of FIG. 5 showing it aligned with a pair of telescoping pipe ends for assembly onto the pipe ends.
Figure 7:
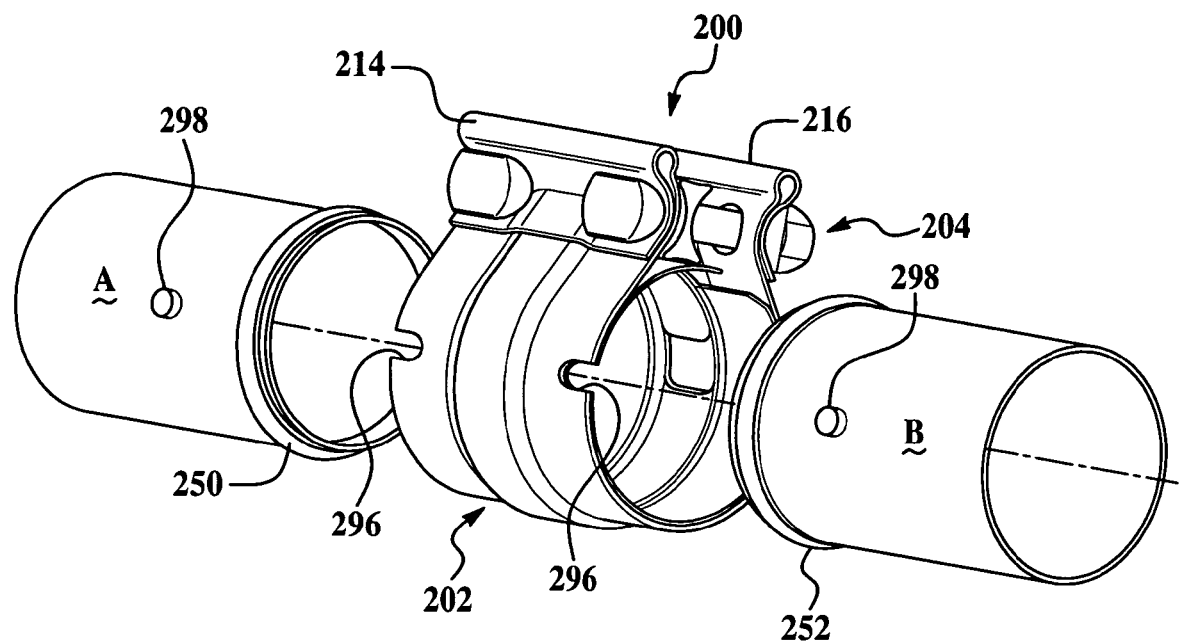
FIG. 7 is a reverse perspective view of that shown in FIG. 6, and further depicts an alternative embodiment of the pipe coupler of FIG. 5 in which the coupler includes notches that align with buttons on the pipe ends to provide relative rotational orientation of the pipe ends with the pipe clamp.
Figure 8:
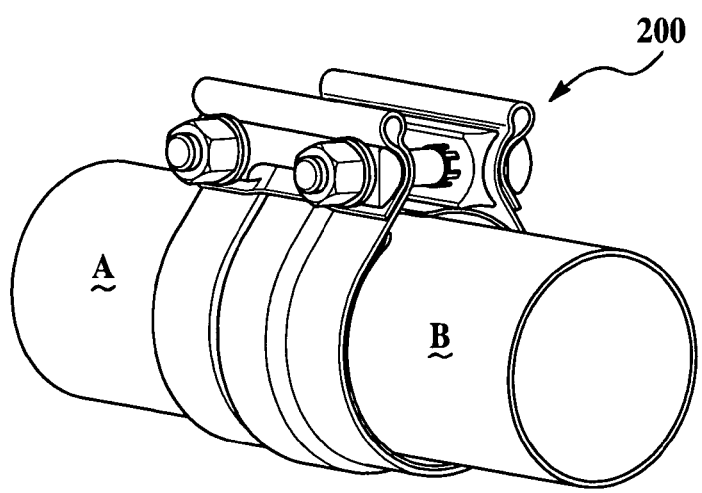
FIG. 8 is a perspective view as in FIG. 6, but with the pipe coupler loosely assembled onto the pipe ends.

The band 202 and sealing sleeve 206 each includes a radially protruding center rib 230 and 232, respectively, that is defined by a pair of tapered side walls 234 and 236, respectively, that extend radially outwardly and somewhat axially toward each other. Extending between the side walls 234 and 236 of the center rib are respective cylindrically tubular sections 238 and 240 of uniform diameter that have an axial length of approximately one-third of the total axial length of the coupler 200. The axial length of these ribs 230, 232 can be substantially more or less than this depending upon the particular application for which the coupler is used. The center rib is designed to coact with a pair of beads 250, 252 at the ends of the two pipes A and B being joined. As shown in FIG. 6, these beads are located just inwardly of the end of each pipe. FIG. 7 shows the same configuration from the reverse side. The width of the center ribs 230, 232 is selected in accordance with the positioning of the beads 250, 252 relative to the ends of the two pipes A and B so that the beads can both sit within the center rib when the pipe ends are brought together into axial, end-to-end abutment. This is shown in FIG. 8 wherein the pipe ends are in abutting contact within the loosened coupler.

The engagement of the pipe coupler 200 with the beads 250, 252 on the pipe ends can be the same as that discussed above in conjunction with the band clamp 10. That is, once the coupler 200 is tightened, the side walls 234, 236 of the center ribs 230, 232 captively retain the beads 250, 252 within the confines of the center ribs. This provides the coupler joint with enhanced pull-apart strength over non-ribbed couplers. Additionally, the other considerations for the center ribs and pipe beads discussed above in connection with the first embodiment apply to pipe coupler 200 as well.

Figure 5:
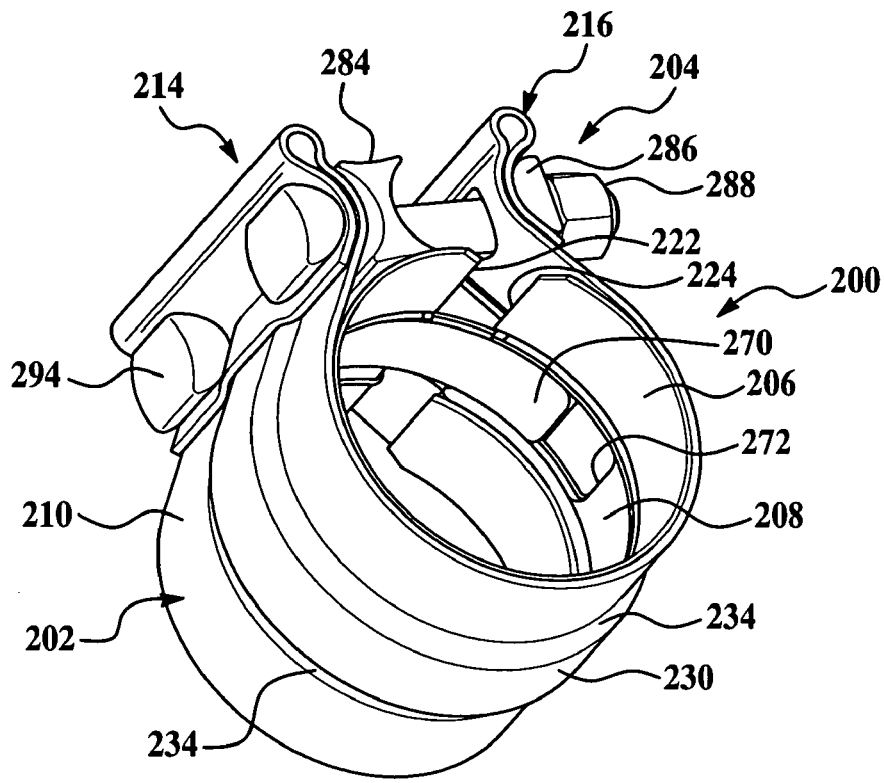
FIG. 5 is a perspective view of a pipe coupler constructed in accordance with a second embodiment of the invention.
Figure 9:
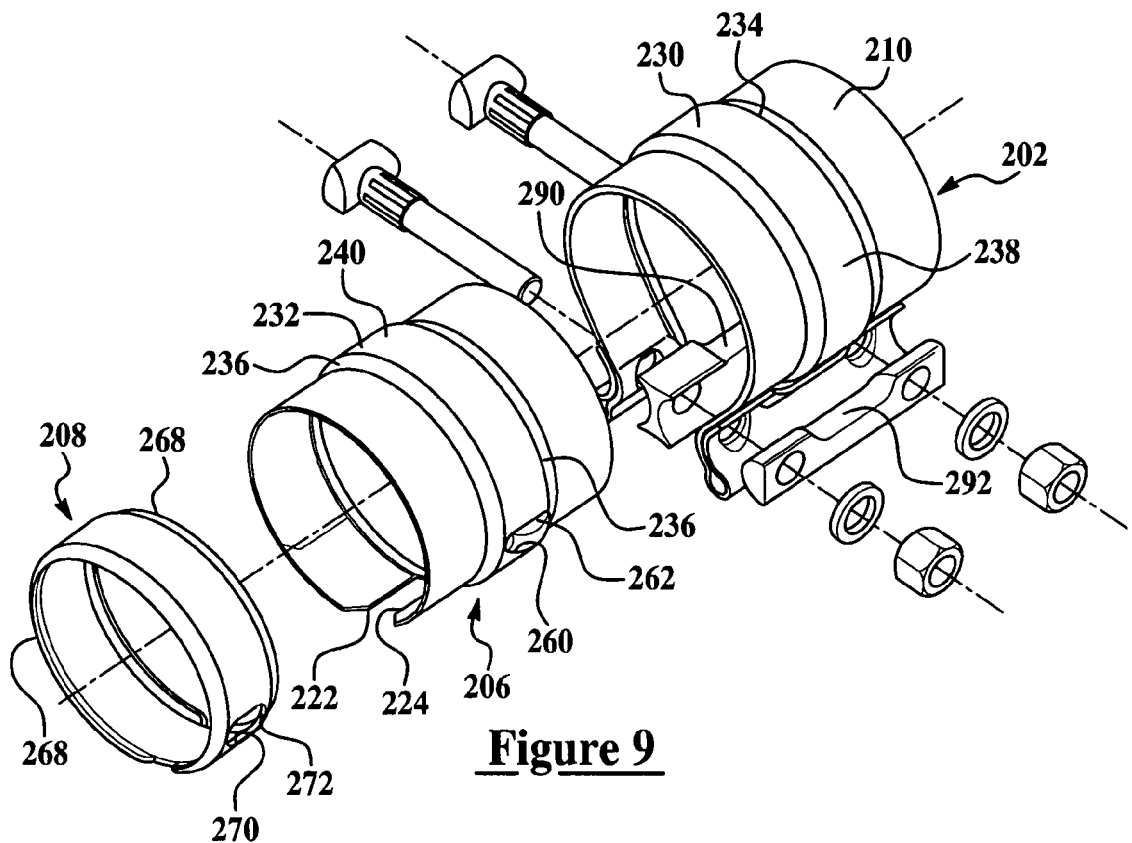
FIG. 9 is an exploded perspective view of the pipe coupler of FIG. 5 showing the individual components of the coupler.

FIG. 9 depicts an exploded view of the coupler components. As is best seen in FIGS. 5 and 9, the mating ends 222, 224 of the split sealing sleeve 206 define a tongue and groove sealing arrangement which utilizes a fixed width (non-tapered) central tongue 260 on one mating end 222 of the sleeve, and a complementary groove or notch 262 in the other mating end 224 of the sleeve. The circumferential separation of the mating ends 222, 224 is chosen such that the mating ends nearly come into engagement with each other once the coupler is fully tightened over the pipe ends. The sleeve 206 is axially coextensive with that of the band 202, although it will be appreciated that the axial length of the sleeve can be more or less than that of the band itself. For example, the sleeve could be located entirely within the center rib 230 itself and could have a conformation that is nearly identical to the gasket 208 shown in FIG. 9. Other features and alternative constructions such as are discussed above in connection with the sleeve 24 of the first embodiment can be used for sleeve 206 as well.

Figure 12:
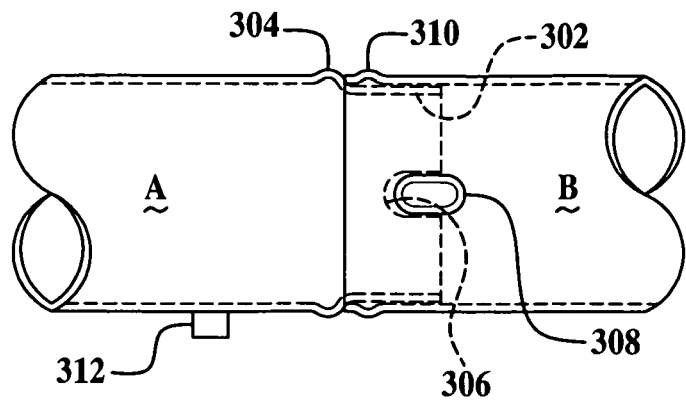
FIG. 12 is a side view showing one configuration of the pipe ends that use a detent and notch arrangement to angularly orient the pipe ends together along with a button to orient a pipe clamp relative to the pipe ends during assembly.

The gasket 208 is designed to fit within the center rib 232 of the split sealing sleeve 206 to provide a gas tight seal of the two pipe ends when the coupler is fully tightened. For this purpose, the gasket 208 of the illustrated embodiment has an axial width about equal to that of the center rib 232 and includes an angled lip 268 at each axial end such that the two axial lips lie against the side walls 236 of the sealing sleeve when the gasket is inserted into the sleeve. Like the sleeve, the gasket includes mating ends having a tongue and groove configuration, with the groove 272 being defined at one mating end by circumferential extensions of the two axial ends (lips) 268 of the gasket, and the tongue 270 being defined at the other mating end by a circumferential extension of the central portion of the gasket. Other end configurations of the gasket can be used. For example, the gasket can have straight ends that overlap each other at least slightly when the band is tightened, as shown in FIG. 12 of the aforementioned U.S. Pat. No. 6,877,780.

The gasket 208 shown in the embodiment of FIGS. 5-9 is aligned with the split sealing sleeve 206 such that the tongue 270 of the gasket overlies the tongue 260 of the sleeve. However, the gasket 208 can instead be oriented within the sleeve 206 such that the mating ends of the gasket are angularly offset from those of the sealing sleeve, as discussed above in connection with the first embodiment. The gasket material itself and other features of the gasket 208 can be the same as discussed above in connection with gasket 26 of the first embodiment.

Figure 10:
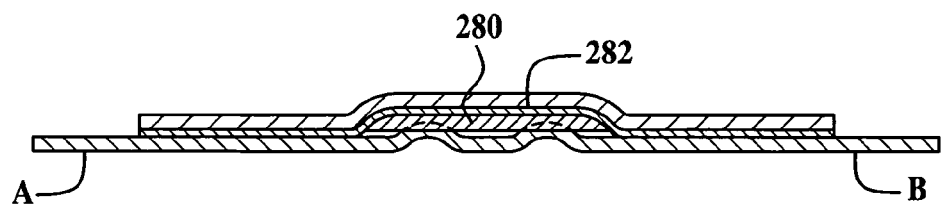
FIGS. 10 and 11 are enlarged, partial cross-sectional views showing an alternative embodiment of the gasket, sleeve, and band of the pipe coupler, in which the relative dimensions of the pipe coupler's center rib and beads on the pipe ends are selected to allow for a gap between the pipe ends.
Figure 11:
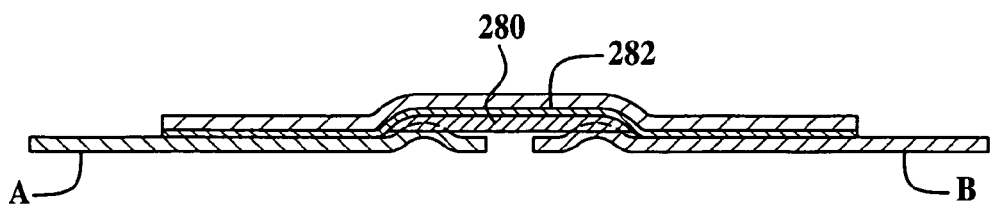

FIGS. 10 and 11 depict cross-sections of a pipe coupler showing a configuration in which the gasket 280 extends the entire axial width of the sleeve's rib 282, but does not include the axial end lips. Also, it will be noted that in this embodiment, the axial width of the rib 282 is greater than that needed to accommodate both beads of the pipe ends—in this case, the design allows for a 5 mm gap between the pipe ends.

Except as noted below, the tightening mechanism 204 can be the same basic construction as tightening mechanism 22 of the first embodiment. Thus, the tightening mechanism 204 comprises a reaction member 284, a half-round backing plate 286, and a pair of nut and bolt fasteners 288 that pass through apertures in the flanges 214, 216 and reaction member 284. The flanges themselves comprises unitary portions of opposite ends of the band 202 that are folded away from each other and back on themselves to define a pair of radially-protruding loops. This gives each flange an inner and outer leg and, as shown, the center rib 230 continues into the lower (radially inwardly located) portion of each leg. The flanges 214, 216 include opposing abutment surfaces on their inner leg and, during tightening of the band, these abutment surfaces engage opposite sides of the reaction member 284 located therebetween. The nuts are tightened against the backing plate 286 (via washers) which distributes the tightening force across the axial width of the flange. It will be appreciated by those skilled in the art that other tightening mechanisms can be used, including those which do not utilize a reaction member.

To accommodate the respective center ribs 230, 232 of the band 202 and sealing sleeve 206, the reaction member 284 and half round backing plate 286 both include a central recess, or notched section 290, 292. This is shown in FIG. 9. These notches allow these components to fit over the center rib 230 so that no increased flange height is needed. This helps maintain a reduced overall profile of the coupler. As shown in FIG. 5, the bolts have half-round T-bolt heads 294 that extend axially toward the center rib 230 to distribute the tightening load across the flange, but these heads stop short of the center rib so that there is no interference between them. The notch depth of the reaction member 284 and/or that of the backing plate 286 can be selected in accordance with the height of the center rib 230 such that when the bolts are fully tightened the reaction member and/or backing plate engage the rib and provide a radially inward force to help lock down the sleeve and gasket over the pipe ends.

One advantage of this two-bolt tightening mechanism 204 over the one-bolt arrangement 22 of the first embodiment is that the bolts apply their greatest band stretching force on either side of the center ribs 230, 232 so that it provides good clamping pressure against the pipe ends at a location axially inwardly of the beads rather than on the beads themselves. This can help provide a good gas-tight seal of the pipe ends and improve the pull-apart strength.

For applications in which it is necessary or desirable to control the insertion depth of the pipe ends and/or set the rotational orientation of one or both pipes relative to the coupler or to each other, the coupler 200 can include a notch 296 at one or both axial ends that engage a corresponding button 298 on the pipe end(s). An example of this arrangement is shown in FIG. 7 which is an alternative embodiment that also includes all of the features of the embodiment of FIGS. 5, 6, 8, and 9. The construction and use of the buttons and notches are more fully described in U.S. Patent Application Publication No. 2005/0099001 A1, published May 12, 2005 and assigned to the assignee of this provisional application. This U.S. Patent Application Publication No. 2005/0099001 A1 is hereby incorporated by reference in its entirety. The button and notch feature can be used with or without the latch shown in that U.S. Patent Application Publication No. 2005/0099001 A1; alternatively, the latch and button can be used as disclosed in that published application without any notching of the coupler band and sleeve. Other such arrangements will become apparent to those skilled in the art.

Figure 13:
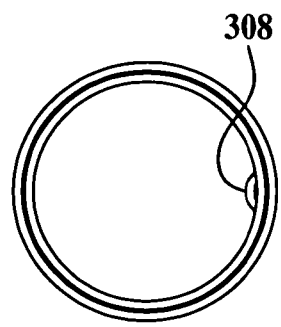
FIG. 13 is an end view of a pair of pipe ends showing the protrusion of the pipe detent from FIG. 12 into the notch on the adjoining pipe.

Referring now to FIGS. 12-15, there are shown various telescopic pipe end configurations that can be used to provide a desired alignment of the pipe ends with each and/or with the pipe clamp. In FIG. 12, the pipe end A includes a reduced-diameter male section 302 extending from the end surface of the pipe A to a radially extending bead 304. The male section 302 includes a notch 306 extending axially from the end surface of the pipe A. The pipe end B includes a radially inwardly protruding detent 308 along with a radially outwardly extending bead 310 that is located axially between the detent 308 and end surface of the pipe B. The notch 306 and detent 308 are sized to mate together as shown which fixes the relative angular orientation of the two pipes. This detent and notch configuration is the same as that shown in FIG. 2. The pipe end A further includes a radially protruding button 312 such as button 298 of FIG. 7. This button 312 can be used in conjunction with a latch or notch on the pipe clamp as described above, to help position the pipe clamp over the junction of the two pipe ends. FIG. 13 shows the engagement of the notch 306 and detent 308 from an end view, and this shows that the detent 308 can protrude inwardly of the male section 302 for a distance.

Figure 14:
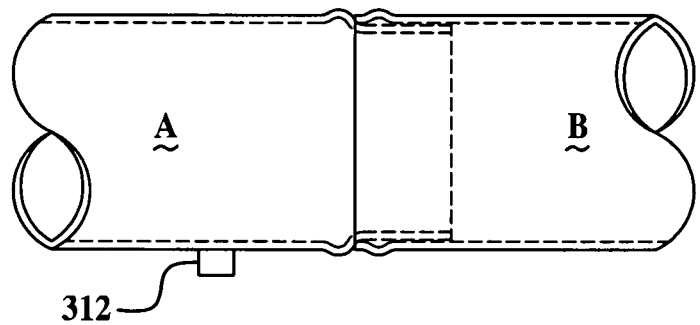
FIG. 14 is a side view as in FIG. 12 which includes a button only so that a pipe clamp can be oriented relative to one of the pipe ends without restricting the angular orientation of the other pipe end.
Figure 15:
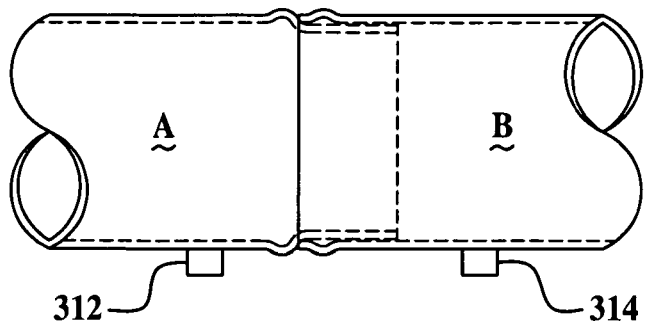
FIG. 15 is a side view of yet another pipe end configuration in which two buttons are used that mate with a pipe clamp to thereby set the relative orientation of the components without using a detent and notch in the pipe ends.

In FIG. 14, no notch and detent arrangement is used, only button 312 and this configuration permits the pipe clamp to be oriented on pipe end A without restricting the relative angular orientation of pipe end B. FIG. 15 depicts a configuration in which a second button 314 is used which can be utilized for a pipe clamp such as shown in FIG. 7 or with one that uses a latch such as disclosed in the above-noted U.S. Patent Application Publication No. 2005/0099001 A1. The positioning of the button(s) relative to the pipe end(s) can be varied as desired or needed for a particular application and depending upon whether a one-bolt or two-bolt pipe clamp is being used. In this regard, it is worth noting that, although a two-bolt clamp can be used as a pipe coupler to attach two abutting pipe ends together, it can also be used for the overlapped (telescopic) type connection shown in FIGS. 12-15. An advantage of the telescopic connection with one of the disclosed gasketed pipe clamps is that, for automotive exhaust applications, this arrangement allows the use of a graphite gasket without the graphite material being exposed directly to the exhaust gases.

Figure 16:
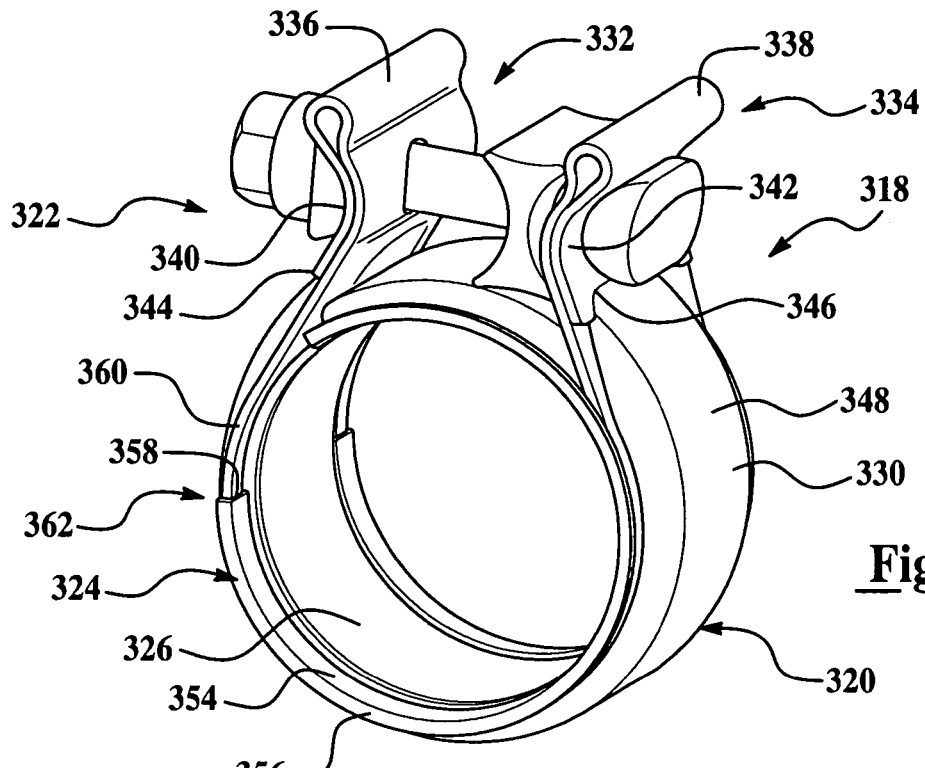
FIG. 16 is a perspective view of a band clamp constructed in accordance with a third embodiment of the invention.
Figure 17:
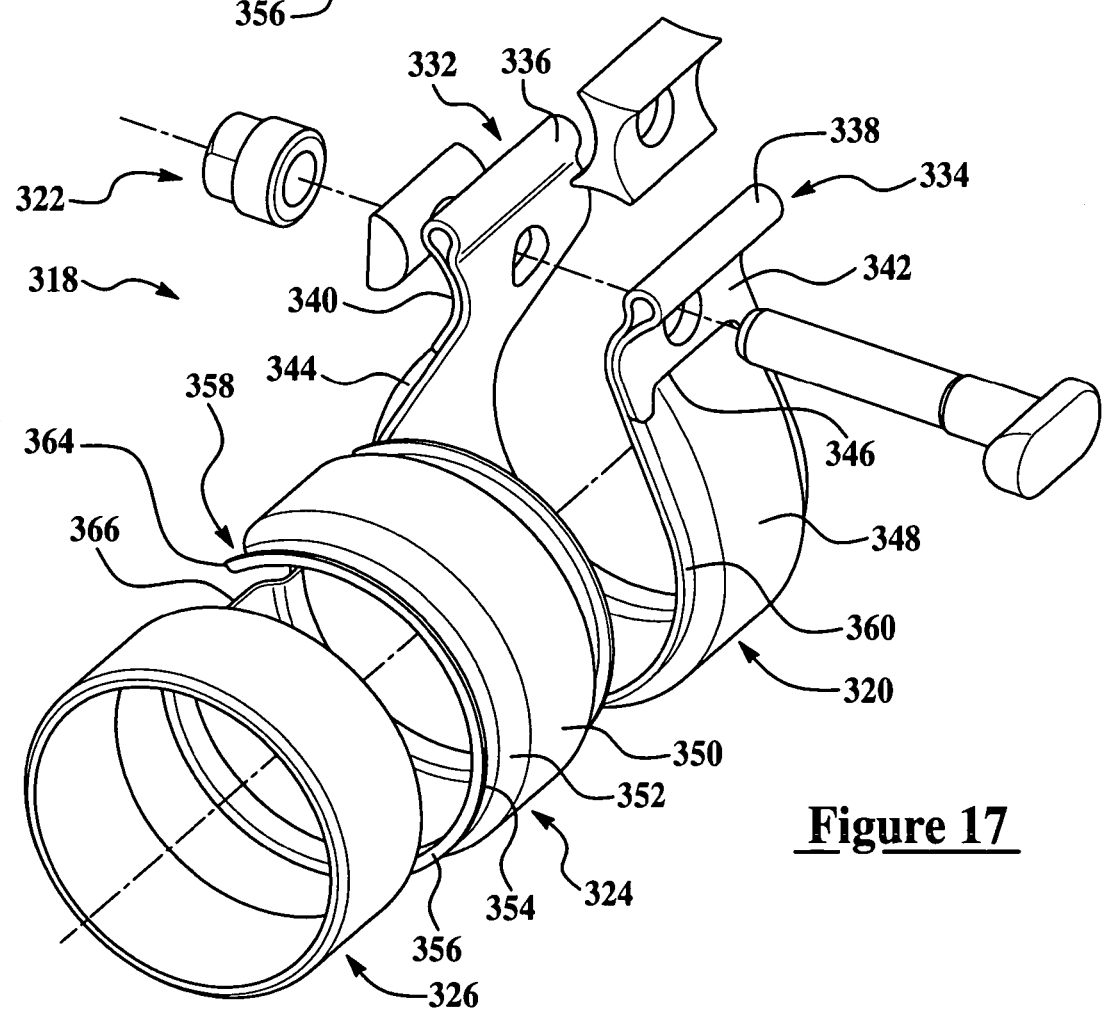
FIG. 17 is an exploded perspective view of the band clamp of FIG. 16.

A third embodiment 318 is disclosed in FIGS. 16 and 17 which show a band clamp that can be constructed in accordance with the first embodiment 10, except that (1) the terminal ends of the folded over portions of the band that define the flanges have a notch to accommodate the center rib, (2) the split sealing sleeve does not use tongue and groove mating ends, but has a pair of upturned flanges at its axial ends to retain it in place within the band, and (3) the gasket is a solid ring (annulus) rather than an open loop. Band clamp 318 includes an open band 320, a tightening mechanism 322, a split sealing sleeve 324, and a gasket 326. As in the first embodiment, the open band includes a main body portion 330 and a pair of flanges 332 and 334 that are formed by unitary extensions of the body portion 330 that extend radially outwardly to a pair of respective loops 336 and 338 where they are folded back on themselves to define inner and outer legs. The outer legs 340, 342 each have a respective terminal end 344, 346 in the form of a notch that is sized to accommodate the center rib 348 of the band 320. The remainder of band 320 and tightening mechanism 322 can be as discussed above in connection with the first embodiment.

The split sealing sleeve 324 is an open loop that includes a center rib 350 extending axially between a pair of side walls 352 which extend radially inwardly from the center rib and then end at a short axial segment 354 of the sleeve. A radially outwardly projecting rim 356 extends from this axial segment 354 and defines the axial margin of the sleeve. At each axial end of the sleeve 324, the side wall 352, axial segment 354, and rim 356 together define a channel 358 which is used to retain the sleeve within the band 320. In particular, the main body portion 330 of the band 320 includes an axial extension 360 on either side of the center rib 348, and the channel 358 snaps over this extension 360 when the sleeve 324 is inserted into the band 320. This fit can be seen at 362 in FIG. 16. The open loop configuration of the sleeve 324 is defined by a pair of mating ends 364, 366 which in this embodiment are straight, axially extending ends; however, a tongue and groove connection or other mating construction could be used instead.

Figure 18:
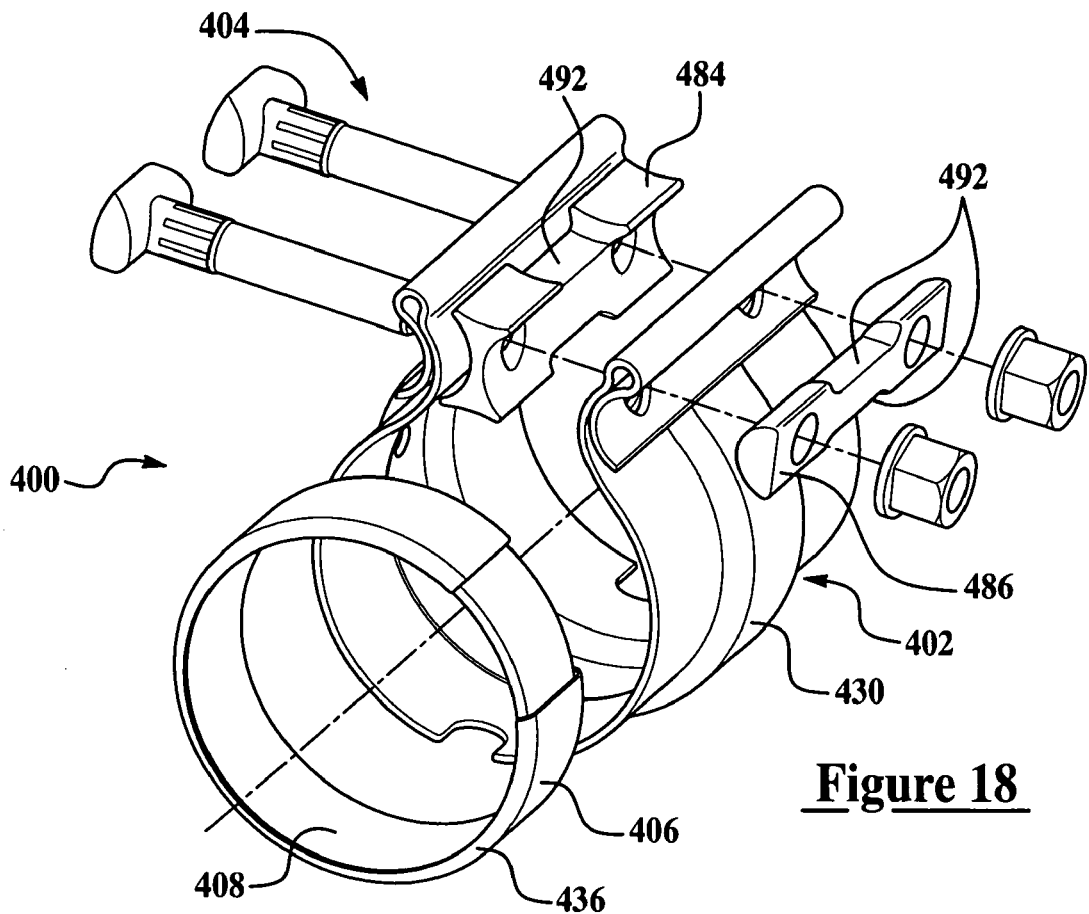
FIG. 18 is an exploded perspective view of a pipe coupler constructed in accordance with a fourth embodiment of the invention.

Turning now to FIG. 18, there is shown a fourth embodiment 400 which uses a band 402 that is the same as band 202 of the second embodiment and uses a fastening mechanism 404 that is the same as the fastening mechanism 204 of the second embodiment, except that the reaction member 484 and backing plate 486 each have a pair of notches 492 rather than a single notch. The notches 492 are provided on both the upper and lower sides of the reaction member and backing plate so that these components can be assembled onto the band 402 in either of at least two rotated positions. This helps minimize the chance of mis-assembly and the resulting potential reduction in clamp performance.

Figures 19, 20, 21:
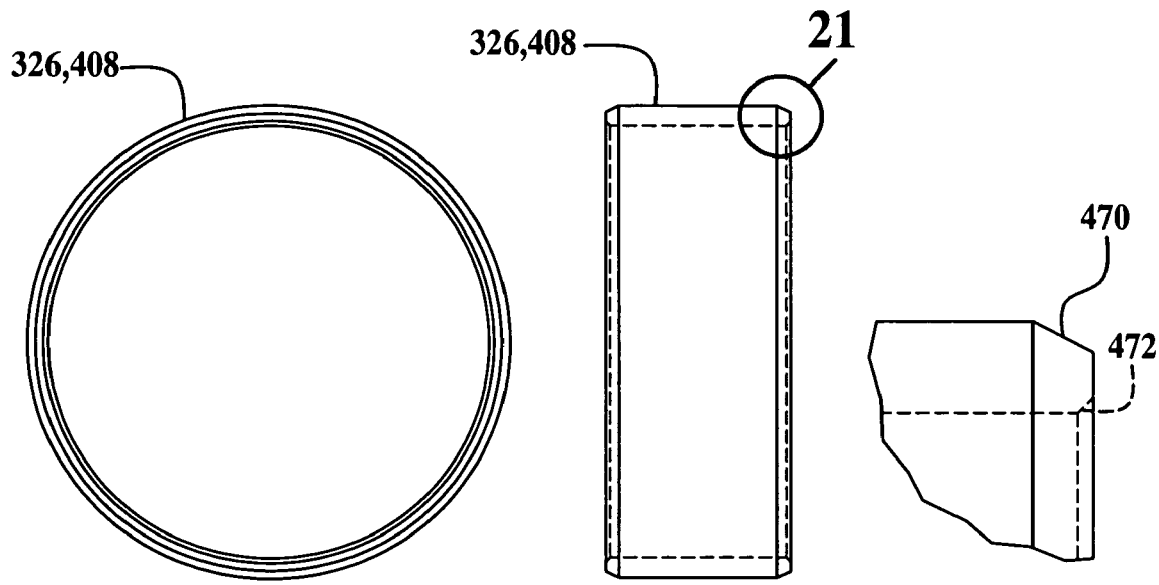
FIG. 19 is an end view of the solid ring gasket used in the embodiments of FIGS. 16-18.
FIG. 20 is a side view of the gasket of FIG. 19.
FIG. 21 is an enlarged, fragmentary view of the axial end detail of the gasket of FIG. 19.

Pipe coupler 400 includes a split sealing sleeve 406 that fits entirely within the center rib 430 of the band 402. Sleeve 406 includes two side walls 436 that form a pocket into which the gasket 408 is seated. Gasket 408 is the same as solid ring gasket 326 of the third embodiment. FIGS. 19-21 show further details of the gasket 326, 408 used in the third and fourth embodiments. As mentioned above, the gasket is a solid (closed) ring of gasket material that fits within the center rib or pocket of the sealing sleeve. The gasket preferably includes a first chamfer 470 on the outer surface at its two axial ends as well as a second, smaller chamfer 472 on the inner surface at its two axial ends. This is shown in the enlarged detail view of FIG. 21. The gasket can be made of exfoliated graphite and preferably has a density of 70-130 lbs/cf (pounds per cubic foot) with 130 lbs/cf preferably being the maximum density desired at full clamping pressure. More preferably, the density is in the range of 73-110 lbs/cf. The higher end of this density range allows greater clamping loads to be transferred through the gasket. Suitable gaskets can be obtained from EGC Enterprises, Inc. of Chardon, Ohio (www.egc-ent.com) or Coniston Profiles of Merseyside England (www.conistonprofiles.co.uk). This gasket can also be used in conjunction with the first two embodiments.

Although the particular dimensions used for the pipe clamp will vary depending upon the application, in one preferred embodiment for automotive exhaust pipes, the pipe ends are provided with beads that protrude 1 to 1.5 mm off the surface of the pipe, and these beads can be formed using segmented expansion fingers such as are used in I/O Tooling. The band and sleeve center ribs can be 4 mm deep, with the gasket being 3 mm thick.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A pipe clamp for connecting two tubular bodies, comprising:
   a band extending circumferentially and continuously from a first end to a second end and having a pair of axial ends, said band including a radially protruding rib located inwardly of said axial ends and extending continuously at least part way between said first and second ends, wherein said first and second ends of said band comprise radially extending flanges;
   a tightening mechanism connected to said flanges to draw said first and second ends toward and away from each other for tightening and loosening of said band;
   a split sleeve disposed within said band and located at least within said rib such that, when tightened, said band compresses said sleeve via direct contact between a radially inward surface of said rib and an outer surface of said sleeve, said split sleeve extending circumferentially from a first mating end to a second mating end; and a gasket disposed radially within said sleeve such that said gasket is located at least partially within said rib.

2. A pipe clamp as defined in claim 1, wherein said flanges each have an aperture aligned with the aperture of the other flange, and wherein said tightening mechanism includes a single nut and bolt fastener and a backing plate, said bolt extends through the aligned apertures of the two flanges, through the backing plate, and into its corresponding nut such that tightening of the nut onto the bolt draws the flanges together via the backing plate.

3. A pipe clamp as defined in claim 2, wherein said tightening mechanism further includes a reaction member located between said flanges.

4. A pipe clamp as defined in claim 2, wherein said bolt includes a head and a shank, said bolt head and said backing plate extending an axial distance sufficient to disperse a force from said tightening mechanism across each of said two flanges.

5. A pipe clamp as defined in claim 1, wherein said flanges are formed from unitary end portions of said band, each of said end portions being folded back over itself to provide said flange with an inner and out leg.

6. A pipe clamp as defined in claim 1, wherein said sleeve includes first and second mating ends having a circumferential separation such that said mating ends nearly come into engagement when said tightening mechanism is fully tightened, but do not substantially touch each other.

7. A pipe clamp as defined in claim 6, wherein said gasket includes first and second mating ends having a circumferential separation such that said mating ends barely come into engagement when said tightening mechanism is fully tightened, but do not substantially overlap each other.

8. A pipe clamp as defined in claim 1, wherein said rib, said sleeve and said gasket each have an axial width that it is generally the same.

9. A pipe clamp as defined in claim 1, wherein said flanges each have a pair of apertures aligned with the apertures of the other flange, and wherein said tightening mechanism includes a pair of nut and bolt fasteners and a backing plate, said bolts each extending through a pair of the aligned apertures of the two flanges, through the backing plate, and into their corresponding nut such that tightening of the nut onto the bolt draws the flanges together via the backing plate, and wherein said backing plate is notched with the protruding rib of the band being located at least partially within said notch.

10. A pipe clamp as defined in claim 9, wherein said tightening mechanism further includes a reaction member located between said flanges, wherein said reaction member is notched with the split sleeve being located at least partially within said reaction member notch.

11. A pipe clamp as defined in claim 1, wherein said flanges are formed from unitary end portions of said band, each of said end portions being folded back over itself to provide said flange with an inner and out leg, and wherein said protruding rib of said band extends into at least a lower portion of said inner and outer leg of each flange.

12. A pipe clamp as defined in claim 1, wherein said gasket comprises a solid ring of graphite material.

13. A pipe clamp as defined in claim 12, wherein said gasket has a density in the range of 70 to 130 lbs/cf.

14. A pipe clamp for connecting two tubular bodies, comprising:

a band extending circumferentially from a first end to a second end and having a pair of axial ends, said band including a radially protruding rib located inwardly of said axial ends and extending at least part way between said first and second ends, said first and second ends having radially extending flanges each having a pair of apertures aligned with the apertures of the other flange;

a tightening mechanism connected to said band to draw said first and second ends toward and away from each other for tightening and loosening of said band, said tightening mechanism including a pair of nut and bolt fasteners and a backing plate, said bolts each extending through a pair of the aligned apertures of the two flanges, through the backing plate, and into their corresponding nut such that tightening of the nut onto the bolt draws the flanges together via the backing plate, and wherein said backing plate is notched with the protruding rib of the band being located at least partially within said notch;

a split sleeve disposed within said band and located at least within said rib, said split sleeve extending circumferentially from a first mating end to a second mating end; and a gasket disposed radially within said sleeve such that said gasket is located at least partially within said rib.

15. A pipe clamp as defined in claim 14, wherein said tightening mechanism further includes a reaction member located between said flanges, wherein said reaction member is notched with the split sleeve being located at least partially within said reaction member notch.

16. A pipe clamp for connecting two tubular bodies, comprising:

a band extending circumferentially from a first end to a second end and having a pair of axial ends, said band including a radially protruding rib located inwardly of said axial ends and extending at least part way between said first and second ends, said first and second ends having radially extending flanges formed from unitary end portions of said band, each of said end portions being folded back over itself to provide said flange with an inner and outer leg, said rib extending into at least a lower portion of said inner and outer leg of each flange;

a tightening mechanism connected to said band to draw said first and second ends toward and away from each other for tightening and loosening of said band;

a split sleeve disposed within said band and located at least within said rib, said split sleeve extending circumferentially from a first mating end to a second mating end; and a gasket disposed radially within said sleeve such that said gasket is located at least partially within said rib.

* * * * *